No. 724,830. PATENTED APR. 7, 1903.
W. EDMUNDS.
PNEUMATIC TIRE.
APPLICATION FILED JAN. 21, 1902.
NO MODEL. 3 SHEETS—SHEET 1.
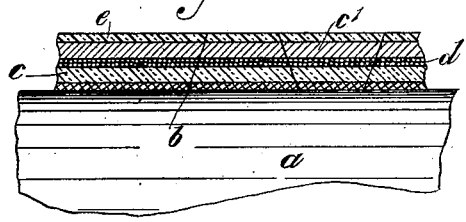
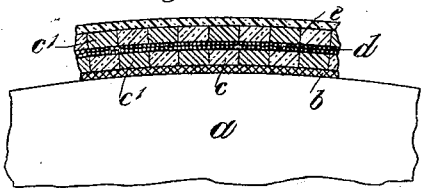
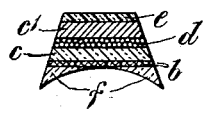
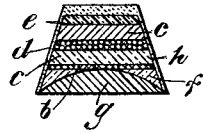
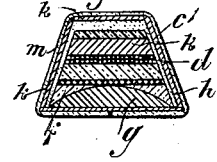
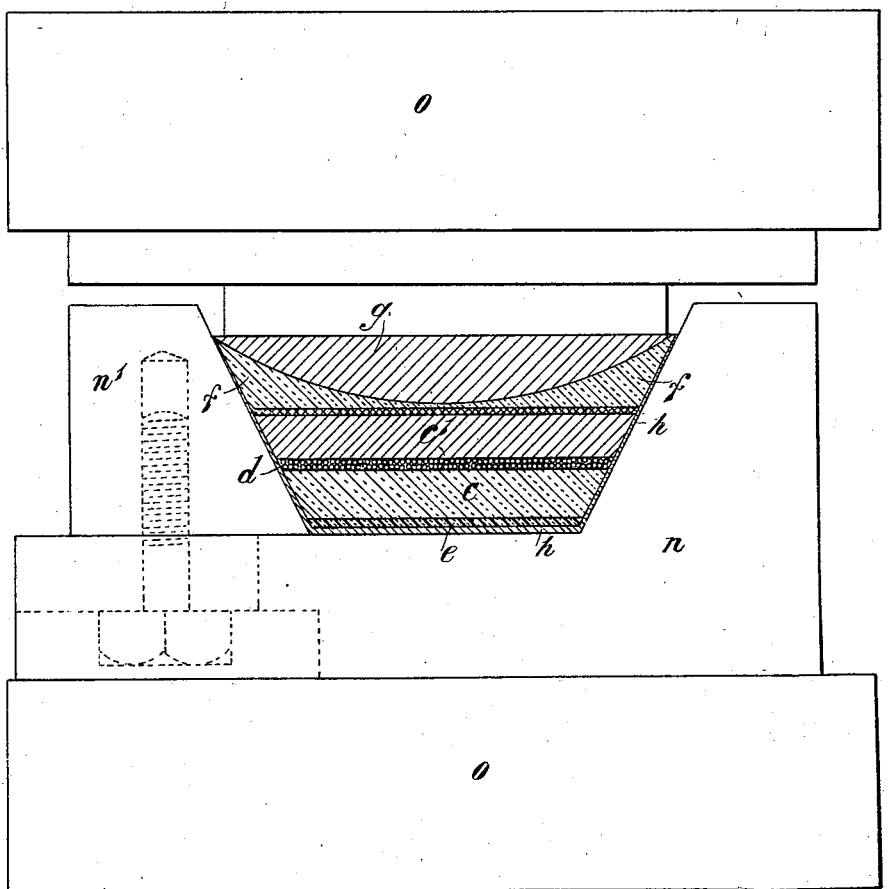
Witnesses Inventor

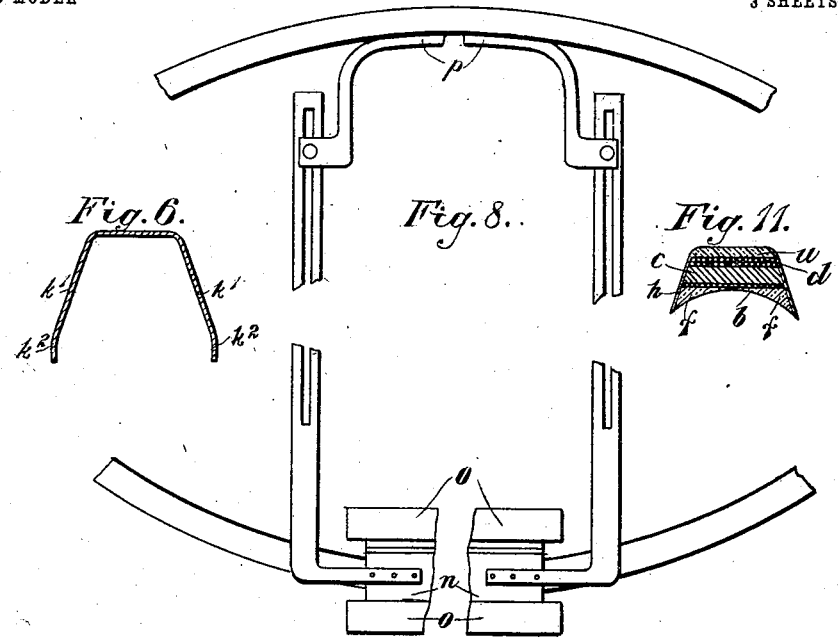
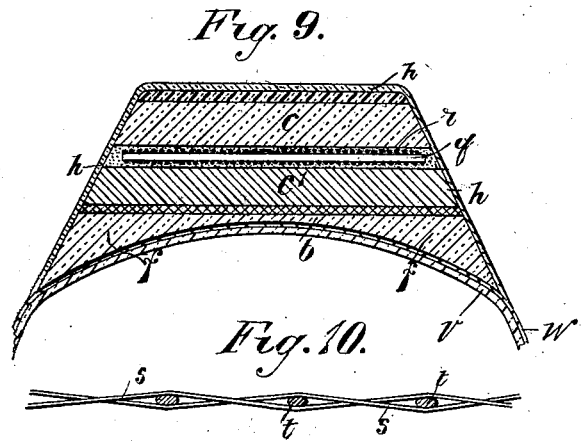
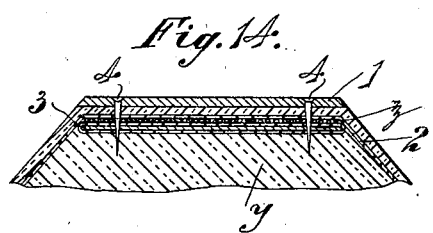
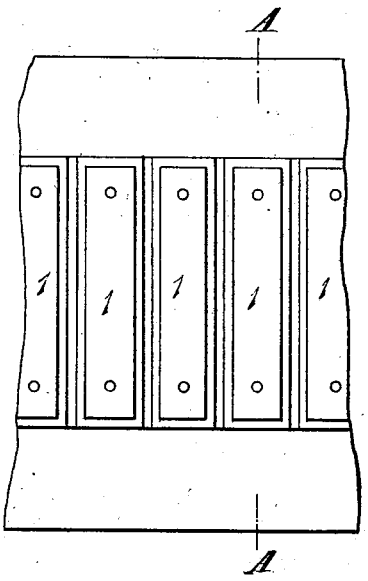

No. 724,830. PATENTED APR. 7, 1903.
W. EDMUNDS.
PNEUMATIC TIRE.
APPLICATION FILED JAN. 21, 1902.
NO MODEL. 3 SHEETS—SHEET 3.
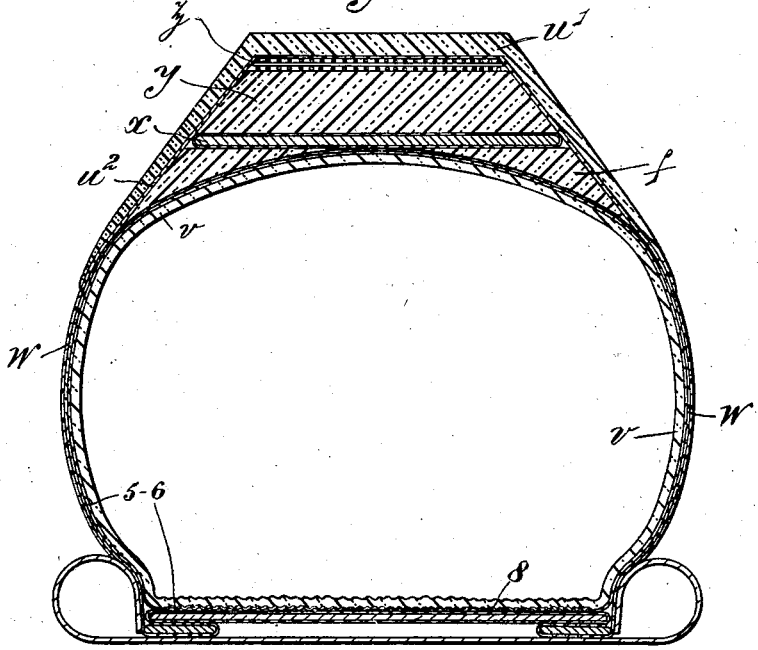
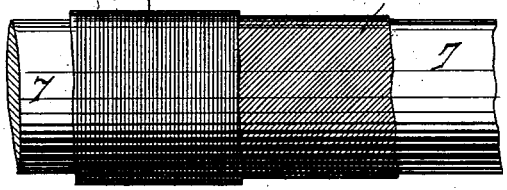
Witnesses  Inventor

UNITED STATES PATENT OFFICE.

WILBRAHAM EDMUNDS, OF LONDON, ENGLAND.

PNEUMATIC TIRE.

SPECIFICATION forming part of Letters Patent No. 724,830, dated April 7, 1903.

Application filed January 21, 1902. Serial No. 90,717. (No model.)

*To all whom it may concern:*

Be it known that I, WILBRAHAM EDMUNDS, a subject of the King of Great Britain and Ireland, residing at London, England, have invented Improvements in and Relating to Pneumatic Tires, of which the following is a specification.

When the action of a pneumatic tire is duly considered, it will be seen that the functions of the tread and of the sides are quite different, and it would therefore appear, *a priori*, to be a necessary step to render such a tire as efficient as it ought to be instead of the tread and the sides being made of similar character and to differ only in thickness, as they are in tires as still commonly made, to clearly differentiate these parts in construction, so that each part shall be specially adapted to fulfil its own particular functions.

The present invention has for its object to produce in a cheap and practicable manner pneumatic tires the tread and side portions of which are specially designed to fulfil their own particular functions in an advantageous manner, such tires being particularly suitable for use on motor-cars and other heavy vehicles.

For this purpose the invention consists in various novel features of construction and in combinations and arrangements of parts, all as hereinafter described, and set out in the accompanying claims.

In the accompanying illustrative drawings, Figures 1 and 2 show, respectively in side elevation and cross-section, part of a drum with material thereon for forming treads for pneumatic tires according to this invention. Figs. 3, 4, 5, and 6 are cross-sections, Fig. 3 showing a compound ring, Fig. 4 showing the said ring mounted on an annular support, Fig. 5 showing the ring inclosed in a mold, and Fig. 6 showing a modified construction of mold. Fig. 7 is a cross-section, and Fig. 8 a side elevation to a smaller scale, showing a modified form of mold with part of a press and a compound ring under treatment in such mold. Fig. 9 is a cross-section showing a modified construction of compound ring. Fig. 10 shows in side view part of a wire ring or band. Fig. 11 is a cross-section showing another modified construction of compound ring. Fig. 12 shows in cross-section a pneumatic tire with a further modified construction of tread. Fig. 13 is a plan showing part of a tire with metal protecting-shoes thereon, and Fig. 14 is a section on the line A A of Fig. 13. Fig. 15 is a detail view showing how a pocket for the air-tube of a pneumatic tire such as described may conveniently be constructed.

Upon a drum $a$, Figs. 1 and 2, of suitable size is tightly wrapped a band $b$ of thin material, such as cotton, covered with india-rubber solution on its outer side. Around the covered band and arranged transversely thereto are placed strips $c\ c'$ of rubber of equal thickness, which are caused by solution to stick to the band and to one another and which are so prepared that on being vulcanized they will become alternately hard and soft. The strips $c\ c'$ may vary in thickness in different cases from about one-eighth of an inch to about three-eighths of an inch and in breadth from about one-quarter of an inch to about one inch, and in each case the hard strips $c$ may, if desired, be made broader than the soft strips $c'$. All over the layer of strips thus formed is wound one, two, or more layers $d$ of strong thread, (two layers are shown,) the said thread on its way to the drum being passed through india-rubber solution. Around the layer or layers $d$ of thread is arranged another layer of transverse rubber strips $c\ c'$ similar to those $c\ c'$ in the first layer, but those strips designed to be hard in the one layer being arranged opposite those designed to be soft in the other layer. One or more thin layers $e$ of soft rubber or of prepared cotton may be placed on one or both sides of either or both the hard and soft layers $c\ c'$. The drum $a$ is then rotated and the material thereon cut through, as indicated at the right-hand side of Fig. 1, so as to form rings of the desired breadth, the cuts being made sloping alternately to one side and the other, as shown. The rings thus formed are then removed from the drum, the alternate ones being turned inside out, so that all the rings will have their broadest portions inward and their narrowest portions outward. Around the inner surface of each ring is then stuck a strip $f$, Fig. 3, of soft rubber of plano-concave section. Each compound ring thus formed is then placed, as shown in Fig. 4, around an annular ring or support $g$, (hereinafter called, for distinction, the "annular" support,) which has a rounded outer periphery adapted to fit the concave side of the soft-rubber strip $f$. Each compound ring is then covered with a layer $h$ of soft rubber, which may be made thicker on the outer surface than at the sides. The ring is then vulcanized in a circular mold, which may be variously constructed. The mold may conveniently and cheaply be formed, as shown in Fig. 5, by placing segmental strips $k$ of metal—for example, zinc—against the sides and a strip $k^*$, preferably of thin steel, around the periphery of the compound ring, so as, in conjunction with the annular support $g$, to form an annular mold the parts of which are held together by winding suitable material $m$—for example, cloth—spirally around the whole, as usual in the rubber manufacture; or in lieu of metal segments $k$, as just mentioned, a ring $k'$, Fig. 6, may be used, formed of a strip of thin sheet metal rolled to an inverted trough-section corresponding to that of the compound ring and provided with a coupling device adapted to draw its ends tightly together when placed around the compound ring and its annular support $g$. In this case it is preferred to form each side of the sheet-metal ring $k'$ with a flat annular portion $k^2$, so that a number of such rings, with inclosed compound rings, may be readily piled one upon another, the flat portions $k^2$ of the several rings $k'$ bearing one against the other and insuring that the compound rings will all be subject to equal compression on the several rings $k'$, being subsequently clamped together. Sometimes, as for large compound rings, it is more convenient to remove the compound ring from its annular support $g$ and partially vulcanize it piece by piece in a straight mold $n$, that is heated between the top and bottom hot plates $o$ of a suitable press, as shown in Figs. 7 and 8. In this case the mold $n$ is preferably made with an adjustable side portion $n'$, so that it can be used for compound rings of various breadths as well as of various circumferences. The said mold is also preferably provided with a vertically-adjustable support $p$ for carrying the portion of the compound ring outside the mold. The compound rings after being thus subjected to a preliminary vulcanization under pressure are replaced on their annular supports and their vulcanization completed as in the other cases hereinbefore described, so as to form complete treads ready to be applied to the outer peripheries of pneumatic tires.

Treads such as described, particularly in the case of large sizes, may each be separately built up on an annular support $g$, Fig. 9, and instead of the layer or layers $d$ of thread one or more rings $q$, of laced or widely-woven wire, embedded in a layer $r$ of soft rubber, may be used. Fig. 10 shows a portion of such a ring, formed of spirally-wound wire $s$, passed alternately over and under transversely-arranged pins $t$ of oval section placed, say, about one inch apart, the wire being preferably of high-quality steel of small gage, say about .813 millimeter.

Sometimes, as in the case of treads for small light tires for cycles and in the case of treads intended to be placed on the top of existing tires without removing the outer rubber covers, treads such as hereinbefore described may be made with only one layer of hard and soft strips $c$ $c'$, as shown in Fig. 11, the hard strips $c$ being then preferably made, in the case of small sizes, about three-eighths of an inch broad and the soft strips about one-eighth of an inch broad and in other sizes in about the same proportion. In this case a layer $u$ of soft rubber should be formed over the layer $d$ of thread to protect the same. The material from which such rings are cut not being uniform on its outer and inner surfaces, the rings cut from it cannot be reversed, as before, so that a little waste occurs in cutting the rings to shape so as to have beveled edges. Light rings thus made may or may not be covered all over with a layer of soft rubber like the others. Sometimes, again, treads having the properties herein desiderated are constructed according to this invention without concentrically-arranged layers of alternately-disposed strips $c$ $c'$ of hard and soft material. Fig. 12 shows a tread of this kind combined with a pneumatic tire comprising in the example an inner air-tube $v$ and an outer cover $w$. Such a tread is made by placing around a metal ring of plano-convex section, such as hereinbefore referred to, a strip $f$ of soft rubber of plano-concave section, around which is placed a transversely-inflexible but longitudinally flexible and compressible band $x$—such as described, for example, in the specification of Letters Patent granted to Thomas Dunn, dated June 28, 1892, No. 477,996—the said band being preferably covered with prepared textile material, so that it will adhere firmly to the rubber strip $f$. Around the band $x$ is placed a flat strip $y$ of soft rubber having beveled sides and of a thickness corresponding, say, to that of the two layers of hard and soft strips $c$ $c'$ of the tread, (shown in Fig. 9,) and around the strip $y$ of soft rubber is placed a flat inextensible band or layer $z$, similar to the band or layer $d$ used on the treads hereinbefore described, the whole being covered with a strip $u'$ of soft rubber, as in the said other constructions of treads. Treads thus constructed are preferably made up singly and may be made of vulcanized materials, so that they will not require vulcanization when made. In this case such a tread is preferably applied to a tire before the outer layer $u'$ of soft rubber is put on, a layer $u^2$ of prepared canvas being preferably laid all over the tread and the sides of the tire, so that the tread becomes firmly united with the tire, after which the outer layer $u'$ of soft rubber is placed around and secured to the canvas layer $u^2$. The inextensible layer or band $z$ in tires thus constructed, as in the treads hereinbefore described, is made of such length as to compress the tire circumferentially to a suitable degree. The effect of this is that practically the whole of the pressure of the air in the tire is borne by the flat strip $y$ of india-rubber, which is pressed against the inner surface of the inextensible layer or band $z$, so that the running surface being flat no material distortion or further compression of the india-rubber will take place at the point of contact with the ground, and the construction instead of impairing the ease of running of the tire, as would be the case if the strip $y$ of india rubber were subject to compression on contact with the ground, will add materially to its ease of running and durability. The outer layer $u'$ of soft india-rubber is preferably molded to the same exterior shape as the outside of the compound rings herein previously described and so as to partly cover the side portions of the tire, as shown. The remaining portion of the sides of the tire require only to be covered with a very thin layer of india rubber to protect them from moisture. This construction of tire is very cheap to produce, as the rubber strip $y$, owing to its being placed inside the inextensible band $z$, does not require to be of such fine quality and necessarily high cost as ordinary outer rubber covers. The said rubber strip may advantageously be made of old air-tubes, which are generally of very fine rubber and can be bought at a very low price. To use them for the purpose mentioned, they are cut open and washed in naphtha and then formed into sheets of suitable thickness with solution, the sheets being then cut into strips or bands of the desired shape.

Treads of either of the forms hereinbefore described may sometimes, as when applied to heavy vehicles, be furnished, as shown in Fig. 13, with metal shoes 1 of suitable shape formed, for example, of thin rectangular pieces of iron or steel, preferably with beveled edges, and which are secured in any suitable manner around the running surface. Owing to the thickness of the threads such shoes can be nailed on like the metal heel and toe pieces on the soles of boots and shoes. When these metal shoes are applied to treads which have not the alternate blocks of hard and soft rubber, it is desirable to place underneath the inextensible band or layer $z$, as shown in Fig. 14, a band 2 of thin metal plates, which is preferably covered with prepared fabric 3, so that such plates will be thereby securely held in their places and through holes in which plates the nails 4, that secure the shoes 1 in place, pass into the india-rubber strip $y$. The band 2 of plates being firmly held in place by the pressure of the air-tube $v$ serves through the nails 4 to prevent circumferential motion of the shoes 1 on the tread.

It will be readily understood that the objects of the plano-concave strip $f$, placed around the inner surfaces of the treads hereinbefore described, are to adapt such treads to fit nicely on the tires, to prevent the edges of the treads damaging the fabrics of the tires to which they are applied, and to avoid too acute flexion of the sides of the tires along the edges of the treads.

In the improved treads the running surface may vary in breadth, say, from about three-eighths of an inch for cycle-tires to about two inches for big motor-car tires, and to any greater breadth that may be desired for heavy vehicles. In thickness they may vary from about one-quarter of an inch for cycle-tires to one inch or more for big motor-cars and heavy vehicles.

Treads constructed as hereinbefore described are designed to combine in the highest practicable degree the following properties: They are inflexible transversely, but as flexible, compressible, and elastic longitudinally within the small range necessary as if they were entirely of soft rubber, yet they will not appreciably compress between the tire and the road, as soft-rubber treads of similar section would do and which would seriously impair the easy running of a tire. Instead of this the improved treads by avoiding also the useless and injurious acute transverse flection of the tread which occurs in ordinary tires add distinctly to the ease of running of a tire and have many other advantages which need not be here detailed, besides being obviously very durable and protecting the tire from all ordinary risks of puncture. They may be applied to tires of all ordinary constructions, either on the top of the existing outer rubber covers or in substitution for the present outer rubber covers, which they may only slightly exceed in weight, the sides of the tires then requiring only a very thin covering of rubber to protect them from wet, as the sides can never come in contact with the road.

Made as described the improved treads, though, as has been said, compressible and elastic longitudinally, are practically inextensible and capable of standing a high strain. They should therefore be made of such a size circumferentially that when applied to a tire they will compress it by about their own thickness, so that when the tread is on a tire its height out of the rim or felly is approximately the same as it would be without the tread, while it is proportionately increased in breadth. The treads are thus subjected to a very high longitudinal tension, which is very important in assisting in securing them in place and the tires in the rims and also in giving lateral stability to the tires, which insures great ease and steadiness of steering with motor-cars and reduces the tendency to side slip. The longitudinal inextensibility and high tension of the tread has further the effect, which is specially important in vehicle-tires, of distributing the side strains to which these tires are subject and which affect them most severely over a considerable portion of the tire before and behind the portion that is at any moment in contact with the ground and which portion in tires of ordinary construction has to bear the whole of these strains. The longitudinal inextensibility of the tread likewise distributes the circumferential strains of the drive of the engine and the brake (which are believed to be often the cause of tire failures) around the whole tire, it greatly reduces the destructive effect of these strains, and transmits them much more efficiently than usual.

As one of the advantages of these treads and one which is believed to be of supreme importance, particularly in the construction of vehicle-tires, is that they enable a tire of given size to carry a given weight with only about half the air-pressure necessary with tires of ordinary construction, it is preferred to use with the treads tires, which may be of any suitable form of attachment, having an outer cover $w$, Fig. 12, made with a single layer of unwoven transverse threads embedded in solution and formed into a fabric by an inner or outer layer of thin textile material or by inner and outer layers of thin textile material, the threads of which are preferably arranged to cross the transverse threads at an angle of about forty-five degrees. Such a fabric is designed to stand to the best advantage the strains it has to bear, and, being very thin in proportion to its strength, it has great durability under the flection to which it is subject in use. This fabric is so thin that sometimes, particularly in the case of large tires, it is found desirable in order to secure greater durability and reliability to reinforce it by inclosing the air-tube $v$ of such a tire in a pocket, which is preferably made, as shown in Fig. 15, by winding a strong thread 5, that is passed through rubber solution, in a close spiral around a tubular layer 6, of textile material, that is covered with india-rubber solution and is supported upon a mandrel 7. Such pockets 5 6 should be made a full size for the outer covers in which they are to be used and should in some convenient manner be compressed transversely or slightly creased longitudinally, either all over or at certain parts, as at the sides or base. In Fig. 12 the pocket marked 5 6 is shown creased or wrinkled at the base of the tire, as indicated at 8. In this way each pocket can be readily made to fit exactly the interior of the outer cover $w$ of the tire in which it is used and so as to be normally free from strain, in consequence of which they will suffer little wear by the flection of the tire; but should the outer cover $w$ of such a tire fail the pocket will maintain the efficiency of the tire until the latter can conveniently be repaired.

Various modifications can be made in the construction of the tires herein described and in the apparatus and in the processes employed in producing them without departing from the principle of the invention. Thus sometimes, as when the running-surface of a tire is not materially narrower than the base of the thickened tread, it is found unnecessary to make the tread transversely inflexible, the inextensible band $d$ or $z$ being then relied upon to keep the tread flat, and so prevent transverse flection therein.

It will be evident that various other changes can be made in the details of construction of my treads and tires without departing from the spirit and scope of the invention so long as the relative arrangement of parts shown in the drawings or the mode of operation described in the specification is preserved.

What I claim is—

1. A tread for a pneumatic tire, comprising an inner portion of india-rubber of plano-concave section, a ring composed of transverse strips of hard and soft material arranged around said inner portion, a ring of india-rubber arranged around said ring of strips, and a longitudinally-extensible band of flexible material, flat in section arranged to support said tread circumferentially.

2. A tread for a pneumatic tire comprising concentric rings each composed of transverse strips alternately of hard and elastic material so arranged that the hard strips in one ring are opposite the elastic strips in the adjacent ring, a longitudinally-inextensible band of flexible material arranged between the said rings, and a strip of elastic material of plano-concave section arranged within and attached to the said rings.

3. A tread for a pneumatic tire comprising concentric rings each composed of transverse strips alternately of hard and elastic material so arranged that the hard strips in one ring are opposite the elastic strips in the adjacent ring, a longitudinally-inextensible band of flexible material arranged between the said rings, a strip of elastic material of plano-concave section arranged within and attached to the said rings, and an outer layer of india-rubber covering the outer periphery and sides of said rings, band and strip.

4. A tread for a pneumatic tire comprising concentric rings each composed of transverse strips alternately of hard and elastic material so arranged that the hard strips in one ring are opposite the elastic strips in the adjacent ring, a longitudinally-inextensible band of flexible material arranged between the said rings, a strip of elastic material of plano-concave section arranged within and attached to the said rings, thin layers of flexible material arranged around the outer ring and inside the inner ring, and an outer layer of india-rubber covering said rings, band and strip.

5. In a pneumatic tire, the combination with the inner air-tube and outer cover of the tire, of a tread comprising concentric rings each composed of transverse strips alternately of hard and elastic material so arranged that the hard strips in one layer are opposite the elastic strips in the adjacent layer, a longitudinally-inextensible band of flexible material arranged between the said rings, and a strip of elastic material of plano-concave section arranged within and attached to the said rings.

6. The method of forming treads for a pneumatic tire, which consists in wrapping a band of material, such as cotton, spread with india-rubber solution, around a cylindrical support, fixing transversely around the band strips of india-rubber so prepared that on being vulcanized they will become alternately hard and soft, then winding one or more layers of strong thread covered with india-rubber solution around the layer of strips, covering the layer or layers of thread with another layer composed of india-rubber, cutting rings of suitable section from the built-up material, attaching a strip of soft rubber of plano-concave section around the inside of each ring, and vulcanizing the compound rings thus formed.

7. The method of forming treads for a pneumatic tire, which consists in wrapping a band of material, such as cotton, spread with india-rubber solution, around a cylindrical support, fixing transversely around the band strips of india-rubber so prepared that on being vulcanized they will become alternately hard and soft, then winding one or more layers of strong thread covered with india-rubber solution around the layer of strips, covering the layer or layers of thread with another layer composed of india-rubber in the form of strips adapted to form alternately-arranged soft and hard strips, cutting rings of suitable section from the built-up material, attaching a strip of soft rubber of plano-concave section around the inside of each ring, and vulcanizing the said compound rings thus formed.

8. The method of forming treads for a pneumatic tire, which consists in wrapping a band of material, such as cotton, spread with india-rubber solution around a cylindrical support, fixing transversely around the band strips of india-rubber so prepared that on being vulcanized they will become alternately hard and soft, then winding one or more layers of strong thread covered with india-rubber solution around the layer of strips, covering the layer or layers of thread with another layer composed of india-rubber, cutting rings of suitable section from the built-up material, attaching a strip of soft rubber of plano-concave section around the inside of each ring, applying an outer covering layer of soft india-rubber to the outer periphery and sides of each compound ring thus formed, and vulcanizing the said compound rings.

9. In a pneumatic tire wherein a strip or thickening of rubber is placed around the tread portion of the tire, forming the said strip or thickening with a flat outer surface, and surrounding it with a flat longitudinally-inextensible band of thread or wire, a strip of rubber of plano-concave section being placed between the said strip or thickening and the outer cover of the tire, and the outer inextensible band being covered with a layer of rubber, substantially as described.

10. In a pneumatic tire, the combination with the outer cover of the tire, of a laterally-inextensible air-tube comprising an inner tube of india-rubber and a laterally-inextensible pocket inclosing said air-tube, said pocket being formed of a tubular fabric the diameter of which is normally less than its full diameter so as to enable it to readily fit the interior of the outer cover of the tire and be normally free from strain, but so that it will, in the event of failure of such outer cover, act to maintain the efficiency of the tire until it can be repaired, substantially as described.

11. In a pneumatic tire, the combination with the outer cover of the tire, of a laterally-inextensible air-tube comprising an inner tube of india-rubber and an inclosing pocket composed of transversely-wound thread, and one or more layers of textile fabric, the said pocket being compressed around its section, or creased longitudinally at various parts, so as to enable it to readily fit the interior of the outer cover of the tire and be normally free from strain, but so that it will, in the event of failure of such outer cover, act to maintain the efficiency of the tire until it can be repaired, substantially as described.

Signed at No. 17 Gracechurch street, in the city of London, England, this 11th day of January, 1902.

WILBRAHAM EDMUNDS.

Witnesses:
 HUGH HUGHES,
 T. J. OSMAN.